US012020859B2

(12) United States Patent
Solovyev et al.

(10) Patent No.: US 12,020,859 B2
(45) Date of Patent: Jun. 25, 2024

(54) HIGH-VOLTAGE COLUMN CURRENT TRANSFORMER

(71) Applicant: Hitachi Energy Ltd, Zürich (CH)

(72) Inventors: Yury Solovyev, Ludvika (SE); Olof Hjortstam, Västerås (SE); Orlando Girlanda, Västerås (SE); Liliana Arevalo, Ludvika (SE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/279,733

(22) PCT Filed: Mar. 15, 2022

(86) PCT No.: PCT/EP2022/056654
§ 371 (c)(1),
(2) Date: Aug. 31, 2023

(87) PCT Pub. No.: WO2022/194844
PCT Pub. Date: Sep. 22, 2022

(65) Prior Publication Data
US 2024/0047134 A1 Feb. 8, 2024

(30) Foreign Application Priority Data
Mar. 17, 2021 (EP) .................................... 21163269

(51) Int. Cl.
*H01F 38/20* (2006.01)
*H01F 27/32* (2006.01)
*H01F 38/30* (2006.01)

(52) U.S. Cl.
CPC ........... *H01F 38/30* (2013.01); *H01F 27/324* (2013.01)

(58) Field of Classification Search
CPC ....................................................... H01F 38/30
(Continued)

(56) References Cited

U.S. PATENT DOCUMENTS 3,380,009 A * 4/1968 Miller ...................... H01F 38/30 336/84 R
3,525,908 A * 8/1970 Allmendinger ......... H01F 38/30 336/174
(Continued)

FOREIGN PATENT DOCUMENTS

CN 105225816 A 1/2016
CN 111199825 A 5/2020
(Continued)

OTHER PUBLICATIONS

International Search Report and Written Opinion of the International Searching Authority, PCT/EP2022/056654, dated May 19, 2022, 10 pages.
(Continued)

*Primary Examiner* — Ronald Hinson
(74) *Attorney, Agent, or Firm* — Sage Patent Group

(57) ABSTRACT

A high-voltage column current transformer comprising a column insulating body and a head arranged thereon is disclosed, whereby the head defines a volume and comprises arranged therein a primary winding conductor, a secondary winding core assembly having secondary winding leads and a conical insulator spacer tapered from a base to an apex with a lateral face therebetween, the conical insulator spacer is arranged with its base on a bottom of the head facing the column insulating body and its apex holds the secondary winding core assembly distant from a wall of the head, the conical insulator spacer comprises at least one ring-shaped electrode embedded in and surrounding the base and another flat, circular shaped electrode embedded in and surrounded by the apex, and the conical insulator spacer comprises at least one opening in the lateral face.

19 Claims, 2 Drawing Sheets

(58) Field of Classification Search
USPC .......................................................... 336/173
See application file for complete search history.

(56) References Cited

U.S. PATENT DOCUMENTS

| | | | | | |
|---|---|---|---|---|---|
| 4,117,437 | A * | 9/1978 | Ottesen | H01F 38/30 | 336/174 |
| 4,701,738 | A * | 10/1987 | Preissinger | H01F 38/30 | 336/107 |
| 4,731,599 | A * | 3/1988 | Preissinger | H01F 38/36 | 336/107 |
| 4,775,849 | A | 10/1988 | Lucas | | |
| 4,808,910 | A * | 2/1989 | Kessi | H02B 11/26 | 336/174 |
| 5,391,835 | A * | 2/1995 | Yao | H01F 27/02 | 174/18 |
| 2019/0198241 | A1* | 6/2019 | Banaszczyk | H01F 27/29 | |
| 2022/0319770 | A1* | 10/2022 | Negri | H01F 38/30 | |

FOREIGN PATENT DOCUMENTS

| | | | |
|---|---|---|---|
| JP | S6218913 | A | 1/1987 |
| JP | S6399712 | A | 5/1988 |
| JP | 663289912 | A | 11/1988 |
| JP | H04127629 | U | 11/1992 |
| JP | H04127630 | U | 11/1992 |
| JP | H04337613 | A | 11/1992 |
| JP | H05243064 | A | 9/1993 |
| WO | 2018113954 | A1 | 6/2018 |

OTHER PUBLICATIONS

SF6 Current Transformers for AC Applications Up to 50KV, Market Brochure, ElectroApparat Group Co., Ltd., 2009, 16 pages.

Notice of Reasons for Refusal for Japanese Patent Application No. 2023-551230, mailed Jan. 23, 2024, 10 pages.

* cited by examiner

HIGH-VOLTAGE COLUMN CURRENT TRANSFORMER

CROSS REFERENCE TO RELATED APPLICATIONS

This application is a 35 U.S.C. § 371 national stage application of PCT International Application No. PCT/EP2022/056654 filed on Mar. 15, 2022, which in turn claims priority to European Patent Application No. 21163269.0, filed on Mar. 17, 2021, the disclosures and content of which are incorporated by reference herein in their entireties.

TECHNICAL FIELD

The present disclosure relates to a high-voltage column current transformer comprising a column insulating body and a head arranged thereon, whereby the head defines a volume and comprises arranged therein a primary winding conductor and a secondary winding core assembly having secondary winding leads. The present disclosure also relates to a method comprising the high-voltage column current transformer and comprising the step of provisioning an insulation system for operation the high-voltage column current transformer at a high voltage potential.

BACKGROUND

High-voltage column current transformers are known from prior art and typically comprise a column insulating body and a head arranged thereon. Such gas-insulated instrument transformers are typically able to withstand currents up to 4,000 A and are designed for AC voltages up to 800 kV. Primary and secondary windings are located inside the upper head part of the transformer. Many commercially available current transformers, however, cannot withstand dielectric stresses under continuous DC operating voltages of up to 535 kV today and even higher voltage withstand may be required in the future.

SUMMARY

It is therefore an object of the present disclosure to provide high-voltage column current transformers that can withstand dielectric stresses under continuous DC operating voltages up to 535 kV or even higher voltages.

The object of the present disclosure is solved by the features of the independent claims. Modified implementations are detailed in the dependent claims.

Thus, the object is solved by a high-voltage column current transformer comprising a column insulating body and a head arranged thereon, whereby:

- the head defines a volume and comprises arranged therein a primary winding conductor, a secondary winding core assembly having secondary winding leads and a conical insulator spacer tapered from a base to an apex with a lateral face therebetween,
- the conical insulator spacer is arranged with its base on a bottom of the head facing the column insulating body and its apex holds the secondary winding core assembly distant from a wall of the head,
- the conical insulator spacer comprises at least one ring-shaped electrode embedded in and surrounding the base and another flat, circular shaped electrode embedded in and surrounded by the apex, and
- the conical insulator spacer comprises at least one opening in the lateral face.

The disclosed high-voltage column current transformer allows to withstand dielectric stresses under continuous operating DC voltage such as for example ≥535 kV DC applications. A key point of the present disclosure is provisioning of the conical insulator spacer, also referred to as spacer, a component of an insulation system, with the at least one electrode and/or the at least one opening. The conical insulator spacer is installed at a bottom part of the head, which makes it possible to simplify the insulation of the high-voltage column current transformer by, for example, exchanging a prior art fiber plastic tube with the proposed conical insulator spacer.

The at least one electrode preferably at the bottom part of the head can carry mechanical and electrical functions, by mechanically connecting the conical insulator spacer with the bottom of the head. Thereby, the electrical functions at the base respectively at a bottom of the conical insulator spacer are the provision of an electrode under the same high voltage potential as the head for providing a favorable electric field distribution inside and around the conical insulator, in particular at a triple point thereof. The electrode of the apex respectively at a top of the conical insulator spacer can transmit mechanical load caused by the secondary winding core assembly. The electrode should have the same ground potential as the secondary winding core to provide a favorable electric field distribution inside and around the conical insulator spacer, in particular at the triple point.

The at least one opening at the lateral face of the conical insulator spacer may provide connection between internal fluid insulating gas volumes in particular comprising SF6, nitrogen or any alternative gas within the high-voltage column current transformer, trapping of metallic and contamination particles and/or can be used for visual inspection during assembly. Thereby, the disclosed solution can be directly implemented into existing heads of prior art high-voltage column current transformers without re-dimensioning the head.

The column insulating body and/or the head, also referred to as tank, can be provided in any material, dimension and/or shape as known from prior art. The primary winding conductor is preferably connected to and/or is part of a network. Also, the secondary winding core assembly can be provided as known from prior art, for example comprising the shape of a toroid with respective secondary winding leads. Internal insulation at least within the head preferably comprises insulating gas. The current transformer and its parts are preferably designed for currents up to 4,000 A and AC voltages from 72.5 to 800 kV, or even more.

The conical insulator spacer preferably comprises a hat-like shape and/or may comprise three parts provided as one piece. Said parts may comprise the lateral face, which in particular is provided inclined in respect to both other parts. Another bottom part in particular only radially extending may be surrounded by the electrode of the base. A further top part may in particular only radially extend thereby surrounding the electrode of the apex. At the base the bottom part can radially extend in a ring-shaped manner outwards away from the lateral face and/or may axially surround the electrode of the base. An inner radial surface of the ring-shaped electrode may be embedded and/or surrounded by the base.

The base may therefore comprise a concave shaped outer radial surface, for example provided as half circle. The ring-shaped electrode may comprise a corresponding convex shaped inner radial surface, for example provided as half circle. An outer radial surface of the circular-shaped electrode may be embedded and/or surrounded by the apex. The apex may therefore comprise a concave shaped inner radial surface, for example provided as half circle. The circular-shaped electrode may comprise a corresponding convex shaped outer radial surface, for example provided as half circle. The term embedded in means preferably that the respective electrode is at least partially covered, for example half covered by the base respectively apex, for example, that in sectional view half of the circumference of the ring-shaped electrode is in particular touching covered by the apex. Also, the base may comprise a U-shaped radially extending opening in particular touching covering the circular shaped electrode.

In sectional view, the bottom part at its radial outwards end may comprise a rounded concave shape, which in axial direction can be surrounded by the electrode of the base. Said electrode may therefore also comprise an exactly fitting rounded convex shape. Similarly, at the apex the top part may extend radially ring-shaped inwards from the lateral face and/or may axially surround the electrode of the apex. In sectional view, the top part at its radial inwards end may comprise a rounded concave shape, which in axial direction can be surrounded by the electrode of the apex, which therefore may comprise an exactly fitting rounded convex shape. Such way both electrodes can be axially encapsulated by the conical insulator spacer.

In this respect, the electrode of the apex/or of the base may be integrated as one piece with the conical insulator spacer, or may be embedded in a fitting manner, for example into epoxy resin. Thus, embedded does not necessarily mean but can be integrated. The electrode of the apex may be a flat, rounded piece, while the electrode of the base may be ring shaped. The at least one opening is preferably only present in the lateral face i.e., not in the bottom part and/or in the top part of the conical insulator spacer. Preferably the conical insulator spacer is with its base mechanically fixed with the bottom of the head. Being distant from the head means in particular that there is no touching connection. The electrodes are preferably arranged with parallel, distant contact surfaces to each other.

In another preferred implementation, the electrodes are provided as molded metal flanges integrated into the conical insulator spacer. Said metal flanges are preferably integrated into the conical insulator spacer and/or can be provided one-piece with the conical insulator spacer. Depending on the level of continuous DC voltage, the conical insulator spacer may comprise a width at the lateral face of up to 65 mm, at the bottom part of up to 80 mm and/or at the top part of up to 90 mm. The conical insulator spacer preferably comprises, in top view, a rounded shape with a diameter of up to 365 mm at the apex and up to 1000 mm at the base. Other dimensions are also possible.

According to a further preferred implementation, the conical insulator spacer comprises epoxy. In this respect epoxy preferably means epoxy resins, also known as for example polyepoxides, as class of reactive prepolymers and polymers comprising epoxide groups.

In another preferred implementation, the high-voltage column current transformer comprises an O-ring sealing provided between the base and the bottom of the head and/or the apex and the secondary winding core assembly. The O-ring sealing preferably comprises elastomer with a round cross-section. A groove can be provided in the base and/or in the apex for seating the O-ring. Preferably the groove is provided in the electrode respectively in the flange.

According to a further preferred implementation, the high-voltage column current transformer comprises a bolting connection between the apex and the secondary winding core assembly. The bolting connection may comprise a screw thread, whereby the apex and the secondary winding core assembly may be provided as respective screw and nut. Thereby the bolting connection can be made with the top electrode. Such way a simple and permanent connection of the apex and the secondary winding core assembly can be achieved.

In another preferred implementation, the conical insulator spacer comprises two, three or four openings in the lateral face. According to a further preferred implementation the openings are arranged in equal distances with regard to each other. Besides that, a great number of opening can be possible.

According to a further preferred implementation, the primary winding conductor is fitted through the secondary winding core assembly, and/or the secondary winding leads of the secondary winding core assembly are passed through the column body. The secondary winding core assembly is preferably provided as toroid, through which in a non-touching manner the primary winding conductor can be fitted through. The secondary winding leads of the secondary winding core assembly can be passed through the column body for connecting with a terminal arranged at the other end of the column body.

The object is further solved by a method for operating a high-voltage column current transformer comprising the high-voltage column current transformer as described before and comprising the step of operating the high-voltage column current transformer at DC voltages up to 535 kV.

Such way, the high-voltage column current transformer can withstand dielectric stresses up to 535 kV DC continuous operating voltage so that the high-voltage column current transformer becomes suitable not only for HVAC, high voltage AC, applications, but also for HVDC, high voltage DC, applications.

Further implementations and advantages of the method are directly and unambiguously derived by the person skilled in the art from the high-voltage column current transformer as described before.

BRIEF DESCRIPTION OF THE DRAWINGS

These and other aspects of the present disclosure will be apparent from and elucidated with reference to the implementations described hereinafter.

In the drawings.

DETAILED DESCRIPTION

Figure 1:
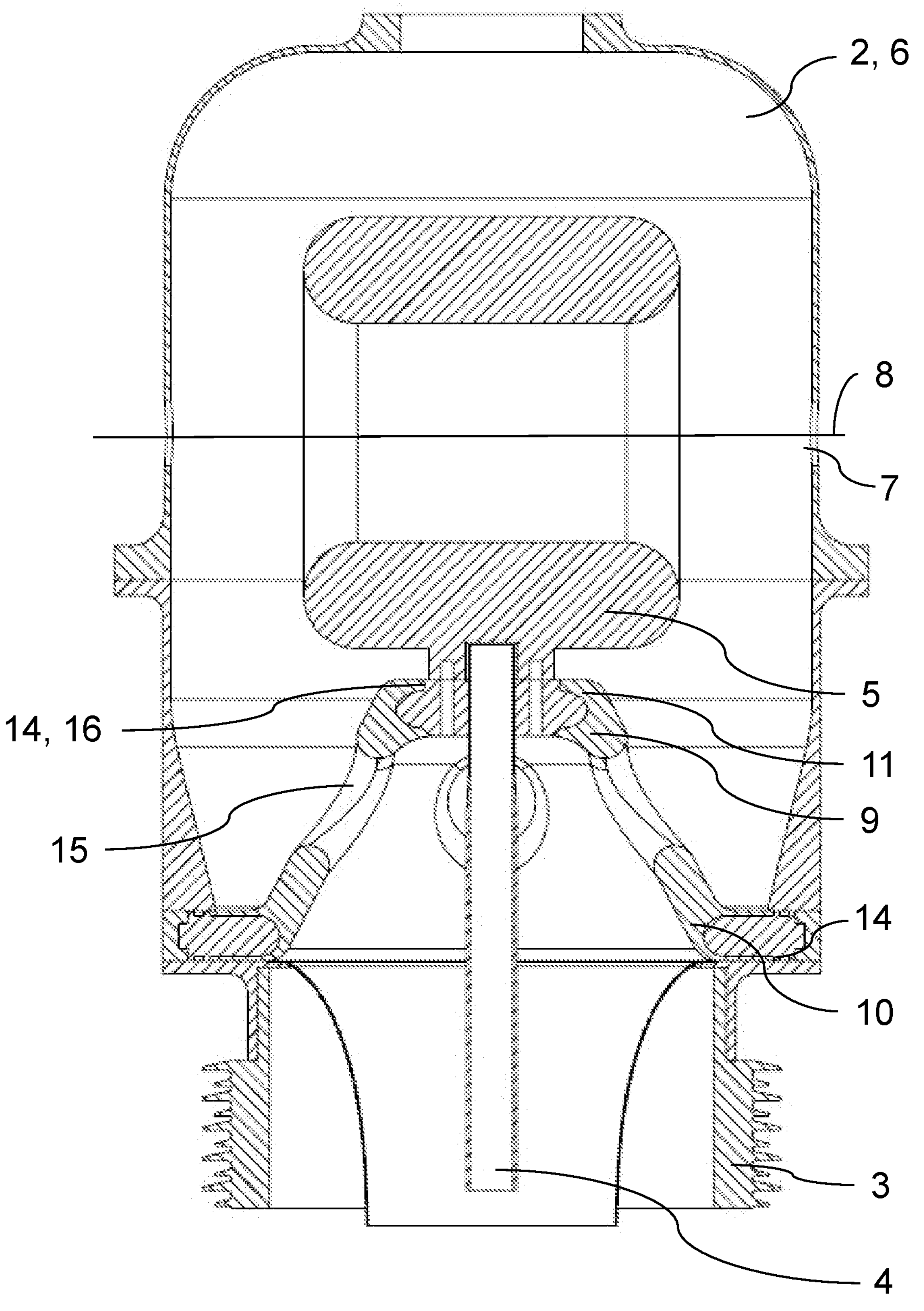
FIG. 1 shows a sectional view of a high-voltage column current transformer according to an exemplary implementation.

FIG. 1 shows a sectional view of a high-voltage column current transformer 1 according to an exemplary implementation. The high-voltage column current transformer 1 comprises a metallic head 2, also referred to as tank. The head 2 is supported by a column insulating body 3 of the transformer 1. The rounded head 2 comprises a height of 1535 mm and a diameter of 1205 mm.

The column 3 represents an elongated hollow core insulating tube posted on a ground or pedestal, not shown in the figure. Terminals for the secondary winding leads 4 run from at least one secondary winding core assembly 5 located inside a volume 6 of the head 2 of the transformer 1.

Windings of the secondary winding core assembly 5 can be arranged, in a known manner, around annular iron cores, or can be made as a Rogowski coils, without a magnetic core. A primary winding, consisting of a primary winding conductor 7, only schematically shown as line, runs through head openings 8 in the form of a hollow cylinder extending through the head 2.

Figure 2:
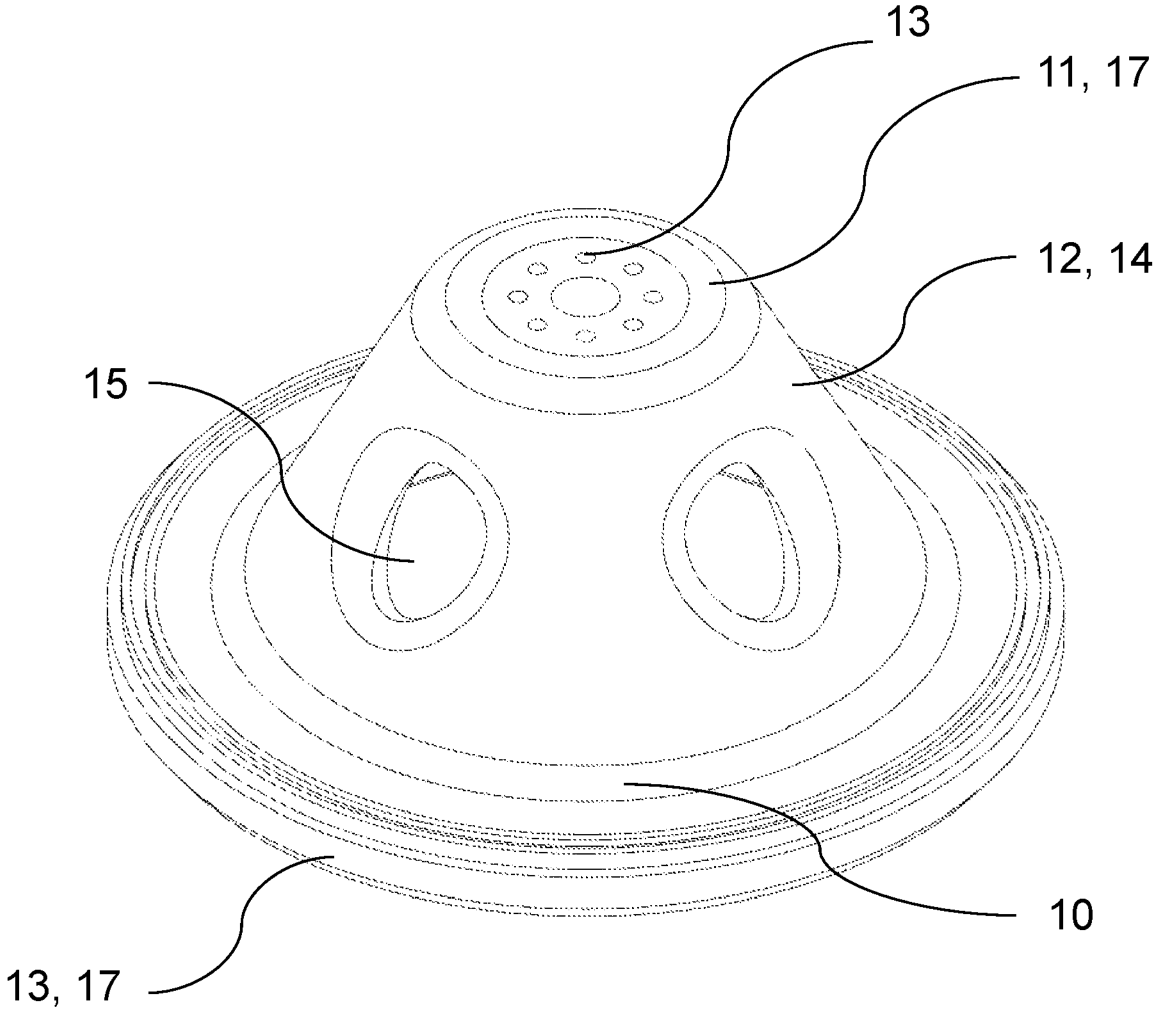
FIG. 2 shows a perspective view of a conical insulator spacer of the high-voltage column current transformer according to FIG. 1.

Further arranged within the head 2 is a conical insulator spacer 9 made of epoxy, which comprise a base 10 and opposite thereto an apex 11, interconnected by a lateral face 12 therebetween, as can be seen in more detail in FIG. 2. The base 10 of the conical insulator spacer 9 is arranged on a bottom of the head 2 facing the column insulating body 3, while the apex 11 holds the secondary winding core assembly 7 distant from the head 2 within the volume 6. The ring-shaped base 10 comprise a diameter of 1000 mm, while the apex 11 comprises a diameter of 365 mm. The apex 11 further comprises a width of 90 mm, while the base 10 comprises a width of 80 mm.

One end of the primary winding conductor 7 and the head 2 are electrically connected to make the primary winding have nearly the same high voltage DC potential as the head 2. The secondary winding core assembly 5 is at ground electrical potential and the conical insulator spacer 9 is provided as a main insulation system between the secondary winding core assembly 5 and the head 2. Though, in the example dielectric stresses caused by application of continuous DC high-voltages are mentioned, it is clarified that the conical insulator spacer is capable of use with AC high-voltages or AC-DC (hybrid) high-voltages applications.

By also referring in particular to FIG. 2, the conical, hat-like insulator spacer 9 comprises molded metal flanges as electrodes 13, which are embedded in the base 10 and in the apex 11. The metal flange of the base 10 is basically ring-shaped and extends away in a radial direction from a conical epoxy body 14 of the insulator spacer 9 thereby surrounding the conical epoxy body 14 in radial direction. The conical epoxy body 14 comprises three parts with are provided one piece, namely said radially extending bottom part surrounded by the metal flange of the base 10, the lateral face 12 and a radially extending top part which surrounds the electrode 13 of the apex 11.

At the base 10 the bottom part extends radially ring-shaped outwards away from the lateral face 12 and axially surrounds the metal flange of the base 10. That is, in sectional view, the bottom part at its radial outwards end comprises a rounded concave shape, which in axial direction is surrounded by the metal flange of the base 10, which therefore also comprises an exactly fitting rounded convex shape. Similar, at the apex 11 the top part extends radially ring-shaped inwards from the lateral face 12 and axially surrounds the metal flange of the apex 11. That is, in sectional view, the top part at its radial inwards end comprises a rounded concave shape, which in axial direction surrounds the metal flange of the apex 11, which therefore also comprises an exactly fitting rounded convex shape.

Such way, both electrodes 13 are axially encapsulated by the conical epoxy body 14. The conical epoxy body 14 insulates the electrodes 13 of the base 10 and the apex 11 from each other. Further, each an O-ring sealing 17 is provided between the base 10 and the bottom of the head 2 and the apex 11 and the secondary winding core assembly 5.

In the lateral face 12, the conical insulator spacer 9 comprises four openings 15, which are arranged distant from each other in regular equal distances. Further, a bolting connection 16 is provided between the apex 11 and the secondary winding core assembly 5 for respectively connection the apex 11 and the secondary winding core assembly 5.

The conical insulator spacer 9 having the said conical epoxy body 14 molded metal flanges as electrodes 13 allows withstanding dielectric stresses under continuous operating DC voltage. Within prior art high-voltage column current transformers 1 existing, a fiber plastic tube with adherent metal shield can be removed and the conical insulator spacer 9 can be simply installed at a bottom part of the head 2. Such way the high-voltage column current transformer 1 with the described conical insulator spacer 9 can be operated with primary winding conductors having a DC voltage up to 535 kV, without re-dimensioning prior art high-voltage column current transformers.

While the present disclosure has been illustrated and described in detail in the drawings and foregoing description, such illustration and description are to be considered illustrative or exemplary and not restrictive; the claims are not limited to the disclosed implementations including the disclosed high voltage ratings. Other variations to the disclosed implementations can be understood and effected by those skilled in the art in practicing the claims, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

1 high-voltage column current transformer
2 head
3 column insulating body
4 secondary winding leads
5 secondary winding core assembly
6 volume
7 primary winding conductor
8 head opening
9 conical insulator spacer
10 base
11 apex
12 lateral face
13 electrode
14 conical epoxy body
15 opening
16 bolting connection
17 O-ring sealing

The invention claimed is:

1. A high-voltage column current transformer comprising a column insulating body and a head arranged thereon,
- the head defining a volume and comprising, arranged therein: a primary winding conductor, a secondary winding core assembly having secondary winding leads, and a conical insulator spacer tapered from a base to an apex with a lateral face therebetween,
- the conical insulator spacer arranged with the base on a bottom of the head facing the column insulating body and the apex holding the secondary winding core assembly distant from a wall of the head,
- the conical insulator spacer comprising:
  - at least one ring-shaped first electrode embedded in and surrounding the base, a flat, circular shaped second electrode embedded in and surrounded by the apex, and at least one opening in the lateral face.

2. The high-voltage column current transformer according to claim 1, whereby the first and second electrodes are provided as molded metal flanges integrated into the conical insulator spacer.

3. The high-voltage column current transformer according to claim 1, whereby the conical insulator spacer comprises epoxy.

4. The high-voltage column current transformer according to claim 1, comprising an O-ring sealing provided between the base and the bottom of the head and/or the apex and the secondary winding core assembly.

5. The high-voltage column current transformer according to claim 1, comprising a bolting connection between the apex and the secondary winding core assembly.

6. The high-voltage column current transformer according to claim 1, whereby the conical insulator spacer comprises a plurality of openings in the lateral face.

7. The high-voltage column current transformer according to claim 6, whereby the plurality of openings are arranged in equal distances with regard to each other.

8. The high-voltage column current transformer according to claim 1, whereby the primary winding conductor is fitted through the secondary winding core assembly, and the secondary winding leads of the secondary winding core assembly are passed through the column insulating body.

9. A head for a column insulating body of a high-voltage column current transformer, the head comprising:

a wall defining a volume;

a primary winding conductor arranged in the volume;

a secondary winding core assembly having secondary winding leads, the secondary winding core assembly arranged in the volume; and a conical insulator spacer arranged in the volume, the conical insulator comprising: a base facing the column insulating body; an apex holding the secondary winding core assembly distant from the wall of the head; and a tapered lateral face extending between the base and the apex;

at least one ring-shaped first electrode embedded in and surrounding the base;

a flat, circular shaped second electrode embedded in and surrounded by the apex; and at least one opening in the lateral face.

10. The head according to claim 9, wherein the first and second electrodes comprise molded metal flanges integrated into the conical insulator spacer.

11. The head according to claim 9, wherein the conical insulator spacer comprises epoxy.

12. The head according to claim 9, comprising an O-ring seal between the base and the bottom of the head.

13. The head according to claim 9, comprising an O-ring seal between the apex and the secondary winding core assembly.

14. The head according to claim 9, comprising a bolting connection between the apex and the secondary winding core assembly.

15. The head according to claim 9, wherein the primary winding conductor is fitted through the secondary winding core assembly, and the secondary winding leads of the secondary winding core assembly are arranged to be passed through the column insulating body.

16. The head according to claim 9, wherein the at least one opening in the lateral face comprises a plurality of openings in the lateral face.

17. The head according to claim 16, wherein the plurality of openings in the lateral face comprises three openings in the lateral face.

18. The head according to claim 16, wherein the plurality of openings in the lateral face comprises four openings in the lateral face.

19. The head according to claim 16, wherein the plurality of openings are arranged in regular equal distances with regard to each other around the lateral face.

* * * * *